Patented May 26, 1942

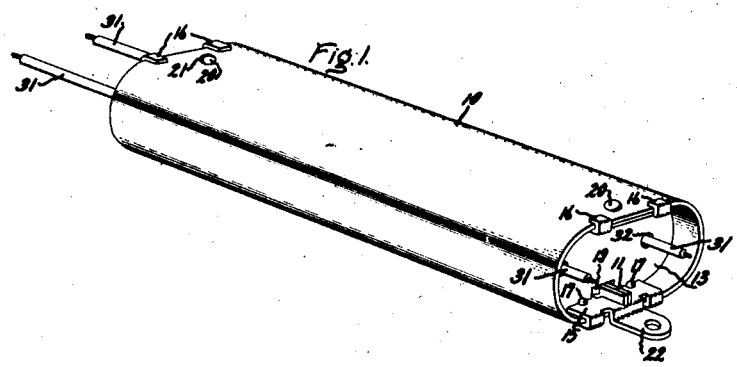

2,284,466

UNITED STATES PATENT OFFICE 2,284,466

CASING FOR ELECTRICAL APPARATUS

Elmer J. Zelt, Fort Wayne, Ind., assignor to General Electric Company, a corporation of New York Application September 28, 1939, Serial No. 296,935

7 Claims. (Cl. 220—4)

My invention relates to casings for electrical apparatus, and the invention is particularly applicable in connection with small electrical devices, such as reactors, condensers, switches, and the like. Casings construed in accordance with the invention may be used to enclose and protect a single device or several devices. In the latter case, the devices may be secured together inside the casing and only the terminals of the completed assembly brought out of the casing. The general object of the invention is provide a simple and economical casing which may be easily and quickly assembled.

The invention will be better understood from the following description taken in connection with the accompanying drawing in which Figure 1 is a perspective view of a casing constructed in accordance with the invention; Figure 2 is a perspective view of the casing with the covers separated from the casing wall; Figure 3 is a sectional view on the line 3—3 of Figure 2; Figure 4 is a perspective view of one end of the casing wall with the cover separated and showing a modified form of the invention; and Figure 5 shows, as an example, a circuit including electrical devices which may be conveniently provided with a common casing constructed in accordance with the invention.

Like reference characters indicate similar parts in all of the figures of the drawing.

The casing shown in Figure 1 includes a wall or body portion 10, formed of sheet metal rolled into an approximately elliptical shape with the edges meeting to form a longitudinal seam 11 along one side. The two meeting or abutting edges of the wall at the seam 11 are turned inwardly in close contact with each other and thus define surface portions facing away from the seam or edge portions. Each end of the casing is closed by a cover 12, which includes a flat sheet or plate 13 preferably formed of insulating material. This cover plate 13 is forced a short distance into one of the end openings of the wall 10 and is secured in place by a sheet metal clip or fastening 14. This clip 14 extends across the central portion of the inner face of the cover plate 13 and each end of the clip 14 is bent up to form a flange 15 extending along the inner surface of the wall 10 toward its outer edge. Small ears 16 projecting from the outer edges of the flanges 15 are bent tightly over the edge of the wall 10 to clamp the clip 14 and the cover plate 13 in place. The flanges 15 extend through shallow recesses in the opposite side edges of the cover plate 13 and the ends of the cover plate 13 are rounded to conform to the inner contour of the wall 10 so as to close the end opening of the casing. Small protrusions 17 forced into the flanges 15 close to the cover plate 13 hold the cover plate in position in the clip 14. The inturned edges forming the seam 11 in the casing wall extend through an opening 18 in one side of the clip 14. This opening 18 extends through one of the flanges 15 and around into one side of the center portion of the clip 14 as shown in Figure 2. Small ears or fingers 19 projecting from opposite sides of the opening 18 engage the inturned edges of the wall to clamp them tightly together and keep the seam tightly closed. This engagement between the ears 19 and the inturned edges of the seam 11 cooperates with the ears 16 to secure the cover 12 in place. The flange 15 opposite the opening 18 is provided with a protrusion or projection 20 which engages an opening 21 in the casing wall 10 to further prevent displacement of the cover. One of the flanges 15 may be formed with an extension 22 to provide a convenient means for securing the casing to a suitable support.

In the modified form of the invention shown in Figure 4, the inturned edges forming the seam 11 as shown in Figure 2 are omitted and the edges of the seam are held closely together by protrusions or projections 23 on the flange 15 which project into openings 24 formed in the edge portions of the wall 10 at opposite sides of the seam, or relatively closely adjacent the opposite sides of the seam. The edges of the wall 10 forming the seam 11 are further secured tightly together by engagement of the ears 16 in small notches 25 properly spaced in the end edge of the wall 10 at opposite sides of the seam 11, such as relatively closely adjacent the opposite sides of the seam. The inturned edges of the seam 11 in the form of the invention shown in Figure 2 give rigidity to the seam and keep the edges of the wall in alignment along the seam 11. In the modified form of the invention shown in Figure 4, a shallow corrugation 26 may be formed at each side of the seam 11 to keep the edges of the wall 10 forming the seam in alignment and to give them rigidity.

A casing constructed in accordance with the invention may be conveniently used in connection with any small electrical device or combination of devices, and, as an example, a well known fluorescent lamp circuit is shown in Figure 5. In this circuit, the fluorescent lamp 27 is connected to a suitable source of current through a reactor 28 and a thermal switch 29.

When the circuit is closed current flows through both cathodes 30 of the lamp. After the cathodes 30 have had time to heat, the thermal switch 29 will open and an inductive kick caused by the reactor 28 will start an arc through the lamp which will continue to give light as long as the circuit is closed. In connection with this circuit, the casing which has been described may be conveniently used to enclose both the reactor 28 and the thermal switch 29, the terminals 31 of the assembled reactor and switch being brought out of the casing through openings 32 in the cover plates 13.

The invention has been explained by describing and illustrating particular forms thereof, but it will be apparent that changes may be made without departing from the spirit of the invention and the scope of the appended claims.

What I claim as new and desire to secure by Letters Patent of the United States is:

1. A casing including a wall portion having edges defining a seam, a cover means within an end of said casing having flanges extending toward the edge of said wall portion, ears on said flanges clamped to the edge of said wall portion, fingers on one of said flanges engaging said edges, an opening in said wall adjacent the edge thereof and a protrusion on one of said flanges extending into said opening.

2. An electrical apparatus casing including a wall portion having a longitudinal seam, a cover plate within an end of said casing, a clip extending across the inner face of said cover plate and having flanges extending along the inner surface of said wall toward its edge, and ears on the outer edges of said flanges and clamped to the edge of the wall to secure the clip and cover plate in position, said flanges having projections engaging said wall at opposite sides of the seam to hold the seam closed.

3. An electrical apparatus casing including a wall portion having abutting edge portions forming a longitudinal seam, portions of said wall on the opposite sides of said seam defining surfaces facing away from said seam, a cover plate within an end of said casing, and a clip secured to the cover plate and to said wall to hold the cover plate in position, said clip having spaced projections engaging said surfaces to hold said edge portions close together.

4. An electrical apparatus casing including a wall portion having a longitudinal seam, the edges of the wall being turned inwardly at the seam, a cover plate within an end of said casing, and a clip secured to the cover plate and to said wall to hold the cover plate in position, said clip having ears engaging said inwardly turned edges of the seam to clamp them together.

5. An electrical apparatus casing including a wall portion having a longitudinal seam, the wall having openings relatively closely adjacent the opposite sides of the seam, notches in the edge of said wall on opposite sides of said seam, a cover plate within an end of said wall, and a clip secured to the cover plate and to said wall to hold the cover plate in position, said clip having projections engaging said openings and ears engaging said notches to hold the edges of the seam together.

6. An electrical apparatus casing including a wall portion having a longitudinal seam and notches in an end edge relatively closely adjacent the opposite sides of the seam, a cover plate within an end of said wall, a clip secured to the cover plate, said clip having ears clamped to the outer edge of the wall in said notches to hold the cover plate and clip in position and the seam closed, and an extension extending from said flange to provide means for securing the casing to a support.

7. A casing comprising a tubular sheet metal member having longitudinal abutting edge portions, portions of said member on the opposite sides of said abutting edge portions defining surfaces facing away from said edge portions, a cover means arranged within an end of said casing having at least one portion clamped over an edge of said member and other spaced portions engaging said surfaces to substantially preclude separation of said edge portions.

ELMER J. ZELT.